UNITED STATES PATENT OFFICE.

WILLIAM D. SNOW, OF PHILADELPHIA, PENNSYLVANIA.

LINOLEUM.

No. 911,340.  Specification of Letters Patent.  Patented Feb. 2, 1909.

Application filed February 14, 1908. Serial No. 415,962.

*To all whom it may concern:*

Be it known that I, WILLIAM D. SNOW, a citizen of the United States, residing at Philadelphia, in the county of Philadelphia and State of Pennsylvania, have invented certain Improvements in Linoleum, of which the following is a specification.

My invention is a linoleum employing a corn product, in place of all or a part of the cork that is generally employed.

The composition which I have devised comprises a mixture of ground or otherwise reduced corn cobs preferably, or corn stalks, with oxidized oil, and may contain other ingredients such as lead compounds, clay and ocher. I have produced a highly satisfactory product by, first, mixing together twenty-two pounds of corn cobs ground to a flour, one pound of litharge, three-fourth of a pound of red lead, four pounds of Peruvian ocher, and two pounds of domestic clay, and, then, intimately mixing such composition with eleven pounds of oxidized linseed oil; the final composition being rolled on a backing fabric and the cloth thus formed dried. A product formed in this manner has been found to be of superior character by reason of its durability, flexibility, smoothness of surface, closeness of texture, minimum tendency to dry out and crack, and low cost of production. I attribute these superior qualities to the incorporation of the fiber, oil and starch found in the corn cobs.

A recognized defect of usual linoleums results from the continuing oxidization in the finished product of the linseed oil contained in it, by which it becomes hard and brittle, curling up and cracking. I have also found that crushed and ground corn stalks may be used with advantage, either alone or with reduced cob, in place of either the whole or a part of the ground cork that is usually employed, with the production of linoleum having characteristics resembling those made by the use of ground cob.

It is to be understood that the leading purpose of my invention is to utilize the valuable characteristics of what I have called "corn products", whether cobs or stalks, by substituting such products in whole or in part for the usual cork, saw dust or like ingredient now used in the production of composition which enters into floor covers.

Having described my invention, I claim:

1. The combination of a reduced corn product with previously oxidized linseed oil.

2. A floor cloth comprising the combination of a lead compound, a previously reduced corn product and a previously oxidized linseed oil.

3. A floor cloth comprising the combination of clay, a previously reduced corn product and a previously oxidized linseed oil.

4. A floor cloth comprising the combination of ocher, a previously reduced corn product and previously oxidized linseed oil.

5. A floor cloth comprising the combination of a lead compound, a clay, a previously reduced corn product and previously oxidized linseed oil.

6. A floor cloth comprising the combination of approximately two parts by weight of pulverized corn cob and one part by weight of oxidized linseed oil.

7. A floor cloth comprising the combination of ground corn cob containing oil and oxidized linseed oil.

In witness whereof I have hereunto set my name this seventh day of February, A. D. 1908, in the presence of the subscribing witnesses.

WM. D. SNOW.

Witnesses:
ARTHUR J. SWAMBACH,
W. L. CORNELL.